United States Patent [19]

Yamashita

[11] Patent Number: 5,490,018

[45] Date of Patent: Feb. 6, 1996

[54] DATA PROCESSING APPARATUS HAVING A DIGITAL RECORDING AND REPRODUCING SYSTEM AND AN ANALOG REPRODUCING SYSTEM

[75] Inventor: Tatsumaro Yamashita, Miyagi, Japan

[73] Assignee: Alps Electric Co., Ltd., Tokyo, Japan

[21] Appl. No.: 235,109

[22] Filed: Apr. 28, 1994

Related U.S. Application Data

[63] Continuation of Ser. No. 9,615, Jan. 27, 1993, abandoned.

[30] Foreign Application Priority Data

Feb. 7, 1992 [JP] Japan ................... 4-56841

[51] Int. Cl.⁶ ..................... G11B 5/09; G11B 5/035
[52] U.S. Cl. ..................... 360/32; 360/53; 360/65
[58] Field of Search ..................... 360/14, 32, 53, 360/61, 65, 15, 51

[56] References Cited

U.S. PATENT DOCUMENTS

| | | | |
|---|---|---|---|
| 4,371,901 | 2/1983 | Shah | 360/65 |
| 4,446,494 | 5/1984 | Stockham, Jr. et al. | 360/13 |
| 4,763,206 | 8/1988 | Takahashi et al. | 360/32 |
| 4,812,924 | 3/1989 | Fukami et al. | 360/32 |
| 5,021,893 | 6/1991 | Scheffler | 360/15 |
| 5,027,228 | 6/1991 | Yokoyama | 360/15 |
| 5,130,864 | 7/1992 | Shimada | 360/60 |
| 5,260,836 | 11/1993 | Yada et al. | 360/63 |
| 5,265,126 | 11/1993 | Yoshikawa | 360/32 |
| 5,303,094 | 4/1994 | Kato et al. | 360/32 |

Primary Examiner—Andrew L. Sniezek
Assistant Examiner—W. Chris Kim
Attorney, Agent, or Firm—Guy W. Shoup; Patrick T. Bever

[57] ABSTRACT

An analog reproduced output can be processed by a digital system circuit in a digital and analog data processing apparatus. An analog output reproduced from a medium on which analog signals are recorded is converted into digital signals by an (A/D) analog to digital converter of a digital recording and reproducing system. These signals are divided signals corresponding to predetermined frequency bands by sub-band filters. The signals are input to a (DSP) digital signal processing section and an (ECC) error correction coding section. An frequency characteristic adjustment operation and an interpolation operation are performed digitally under the control of a controller. Then, for example, the signals are converted by a (D/A) digital to analog converter and output.

3 Claims, 2 Drawing Sheets

DATA PROCESSING APPARATUS HAVING A DIGITAL RECORDING AND REPRODUCING SYSTEM AND AN ANALOG REPRODUCING SYSTEM

This application is a continuation of application Ser. No. 08/009,615, filed Jan. 27, 1993, abandoned.

BACKGROUND OF THE INVENTION

1. Field of the Invention

The present invention relates to a data processing apparatus having at least a digital recording function and an analog reproducing function provided therein. More particularly, the present invention relates to a data processing apparatus which uses analog signals reproduced from a medium on which analog signals are recorded by using a part of a circuit of the digital recording section.

2. Description of the Related Art

In recent years, tape players capable of digitally recording and reproducing acoustic signals and also analogally reproducing acoustic signals have been developed.

As shown in FIG. 2, tape players of the above types have provided therein a digital recording system 1 for recording digital signals on magnetic tape by a magnetic head H1, a digital reproducing system 2 for reproducing digital signals by a magnetic head H2, and an analog reproducing system 3 for reproducing analog signals by a magnetic head H3.

In this type of conventional player, the digital recording system 1 and the digital reproducing system 2 are formed as a digital system processing section having a common digital processing circuit. The analog reproducing system 3 is formed in a path different from that digital processing circuit.

As a result of providing an analog reproducing system in a path different from that for a digital processing circuit in the above-described way, frequency processing circuits for analog signals must be provided independently of the digital system in the analog reproducing system 3. More specifically, a reproducing amplifier is provided in an output section of the magnetic head H3 in the analog reproducing system 3. An equalizer capable of switching depending upon the difference between normal/chrome or metal tape, an analog frequency characteristic adjustment circuit for performing various adjustments of frequency characteristics or the like for Dolby noise reduction (Dolby is a registered trademark of a Dolby laboratory) and doubled-speed reproduction must be provided in the output section of the reproducing amplifier.

Since, as described above, an independent frequency characteristic adjustment circuit of an analog system is provided within the analog reproducing system 3, the circuitry of the entire tape player becomes complex, increasing costs. Since a signal processing system of a digital system and the analog reproducing system 3 are provided as separate paths, the control process for the entire apparatus becomes also complex.

SUMMARY OF THE INVENTION

The present invention solves the above-mentioned problems of the prior art.

An object of the present invention is to provide a data processing apparatus having a digital recording and reproducing system and an analog reproducing system, the apparatus being capable of performing frequency characteristic adjustments or data interpolation for reproduced signals of the analog reproducing system by using the circuit of a digital recording and reproducing system.

To achieve the above-described object, according to the present invention, there is provided a data processing apparatus comprising a digital recording and reproducing system and an analog reproducing system, the digital recording and reproducing system having provided therein an analog to digital (A/D) converting section for converting input signals to digital signals; a band-pass filter for dividing these digital signals into signals for each predetermined frequency band; a recording signal processing section for processing these divided signals to be recording signals; and a recording section for recording processed signals on a medium, wherein an output reproduced from the medium on which analog signals are recorded is input to the A/D converting section where the analog signals are converted into digital signals, the signals are input to the band-pass filter, and a digital filter processing section is provided for obtaining a reproduced output by setting frequency characteristics at the signals which are divided for each predetermined frequency band using the band-pass filter.

To achieve the above-described object, there is provided a data processing apparatus comprising: a digital recording and reproducing system and an analog reproducing system, the digital recording and reproducing system having provided therein an A/D converting section for converting input signals into digital signals, and a data correction interpolation section for performing data interpolation of these digital signals, wherein an output reproduced from a medium on which analog signals are recorded is input to the A/D conversion section where the signals are converted into digital signals and a digital signal processing section is provided for obtaining a reproduced output by performing data interpolation using the data correction and interpolation section.

With the above-described construction, signals reproduced from a medium on which analog signals are recorded are input to an A/D converting section where the signals are converted into digital signals. These digital signals are divided into signals for each predetermined frequency band by means of a band-pass filter provided in the digital recording and reproducing system. These signals divided for each predetermined frequency band are processed by an equalizer or by performing frequency adjustments, such as Dolby noise reduction, thus forming a reproduced output. Since frequency processing is performed digitally by using at least an A/D converting section and a band-pass filter, there is no necessity to provide an analog frequency adjustment circuit separately in the analog reproducing system.

With the above-described construction, signals converted into digital signals are interpolated by a data correction and interpolation section provided in the digital recording and reproducing system, thus forming a reproduced output. It is possible to remove noise caused by tape damages, which is difficult in the analog reproducing system, by performing signal interpolation digitally by using a data correction and interpolation section provided in the digital recording and reproducing system in the above-described way.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DESCRIPTION OF THE PREFERRED EMBODIMENT

An embodiment of the present invention will be explained below with reference to the accompanying drawings.

Figure 1:
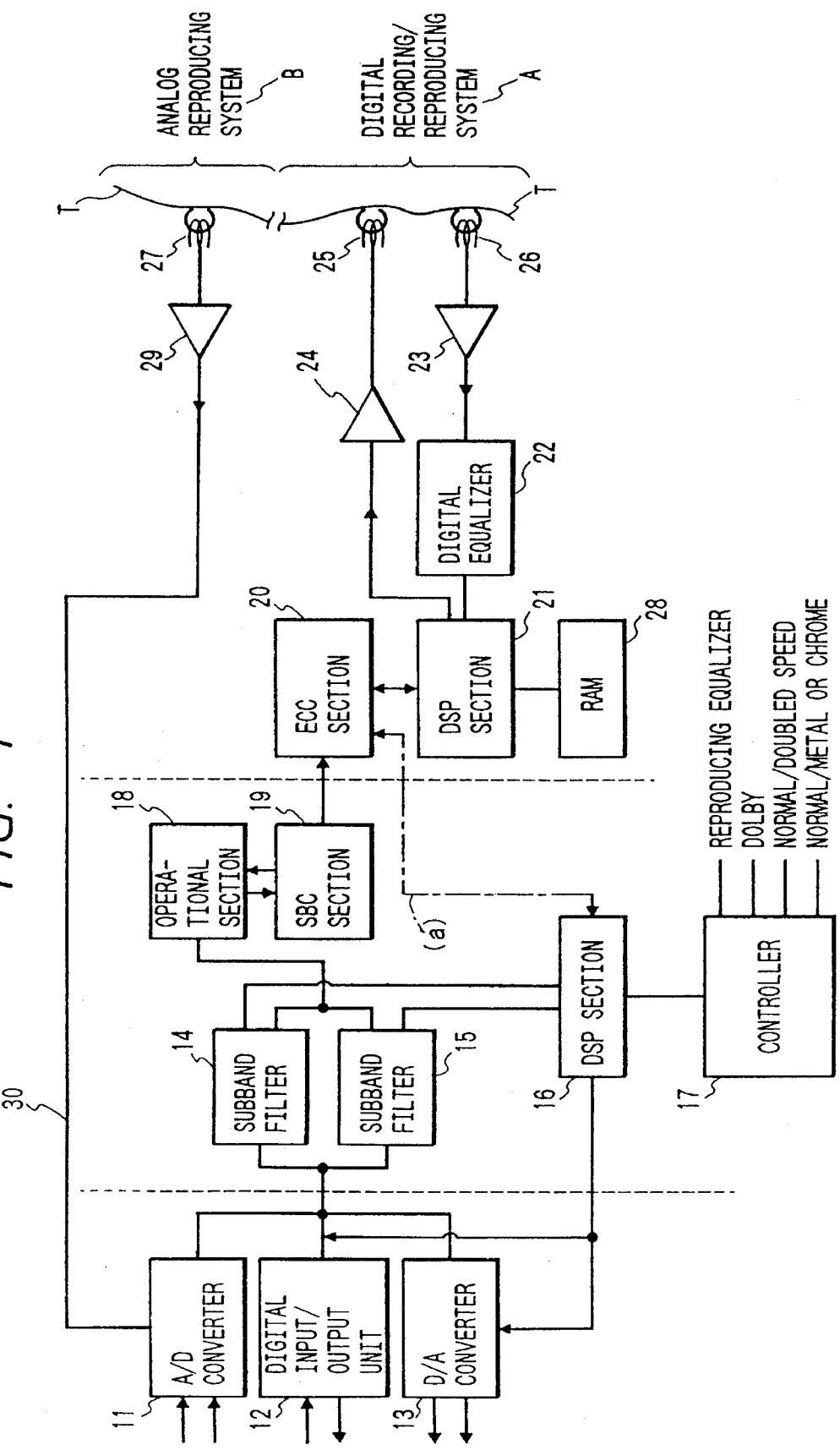
FIG. 1 is a block diagram schematically illustrating the construction of a tape player according to an embodiment of the present invention.
Figure 2:
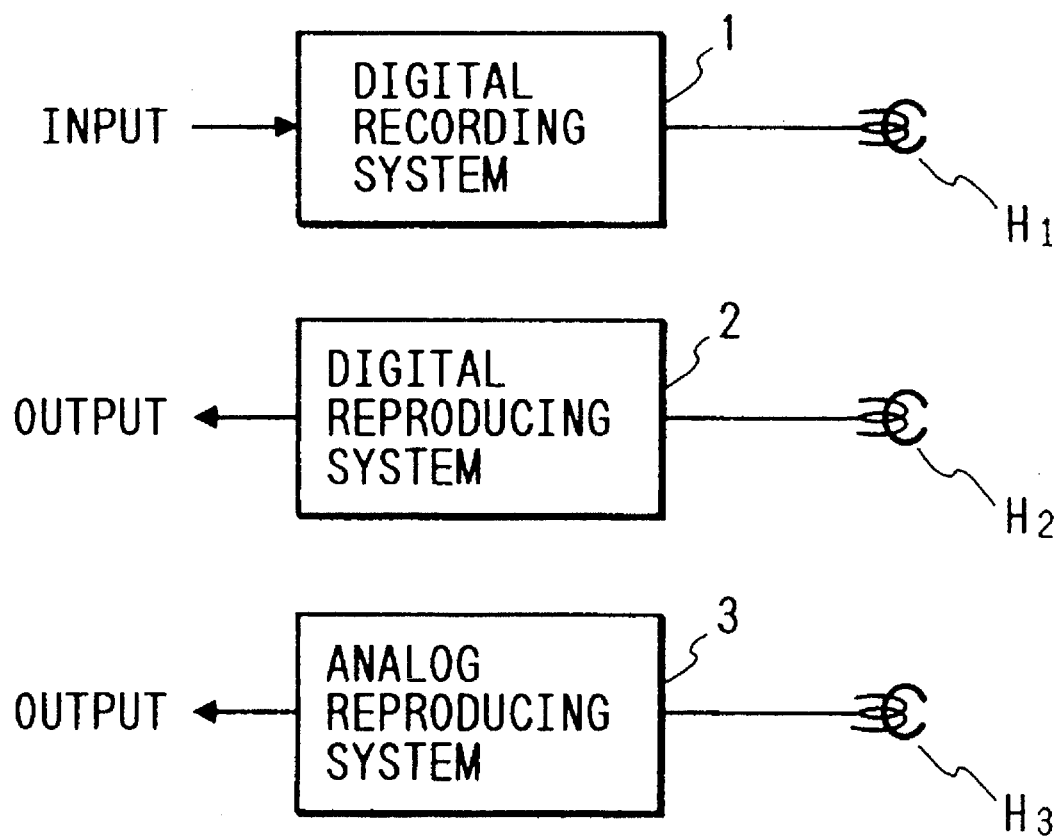
FIG. 2 is a block diagram schematically illustrating the construction of a conventional tape player.

FIG. 1 is a block diagram schematically illustrating the construction of a signal processing apparatus of a digital and analog tape player according to an embodiment of a data processing apparatus of the present invention.

Referring to FIG. 1, shown in the digital recording and reproducing system A are an analog to digital converter 11 (shown as "A/D converter" in FIG. 1) for converting input analog signals into digital signals, a digital signal input and output unit 12, and a digital to analog converter 13 (shown as "D/A converter" in FIG. 1) for converting reproduced digital signals into analog signals.

The analog to digital converter 11, the digital to analog converter 13 and the digital signal input and output unit 12 are each connected to the sub-band filters 14 and 15.

The sub-band filter 14 is used for, for example, a right channel, and the sub-band filter 15 is used for a left channel. These sub-band filters 14 and 15 divide input digital signals into signals for each predetermined frequency band during a recording operation and reconstruct the divided signals so that they can be output as, for example, acoustic digital signals during a reproducing operation. Reference numeral 18 denotes an operational section for digital recording and reproduction. During recording, the operational section 18 performs operations on digital signals divided for each predetermined frequency band by means of the sub-band filters 14 and 15 so that the signals are compressed and encoded so as to be recording signals with audible bands as main bands. The operational section 18 decodes acoustic digital signals reproduced from codes of compressed reproducing signals.

Reference numeral 19 denotes a SBC (sub-band coding) section where signals compressed and encoded by the operational section 18 are formatted so as to be recorded on tape. During reproduction, signals read from tape are deformatted by the SBC section and sent to the operational section 18.

Reference numeral 20 denotes an ECC (Error Correction Code) section, wherein an error correction code is added to the signal formatted by the SBC section 19 during recording and errors of signals read from the tape are corrected or the signals are interpolated during reproduction.

Reference numeral 21 denotes a DSP section where a synchronization signal or the like is added to the formatted digital signal so that it is synchronously modulated to recordable signals during recording, and the reproduced signal is synchronously demodulated during reproduction. Reference numeral 28 denotes a RAM (Random Access Memory) used for processing by the DSP section 21. A digital equalizer adjusts the frequency of the digital signals reproduced from magnetic tape.

Reference numeral 24 denotes a recording digital amplifier. A digital output from this recording digital amplifier 24 is recorded on magnetic tape T by a recording magnetic head 25. Digital signals read out from magnetic tape T by a magnetic head 26 are output from a reproducing digital amplifier 23 to the equalizer 22.

Next, an explanation will be given of the construction of an analog reproducing system B.

In the analog reproducing system B, an output read from magnetic tape T by an analog reproducing magnetic head 27 is amplified by an analog reproducing amplifier 29. In this embodiment, however, an output path from the analog reproducing amplifier 29 is input to the analog to digital converter 11 of the digital recording and reproducing system A. It is also possible to output signals from the magnetic tape T via the digital magnetic head 26 so as to input the signals to the analog to digital converter 11.

An analog output from the analog reproducing amplifier 29 is converted into digital signals by the analog to digital converter 11 and input to the sub-band filters 14 and 15 where the signals are divided into signals for each predetermined frequency. A DSP section 16, i.e., a digital signal processing section for adjusting the frequency of digital signals, is provided to process signals converted from an analog form into a digital form.

Frequency processing is performed by the DSP section 16 in a specified mode in response to the reception of a control signal from the controller 17. The DSP section 16 functions as a reproducing equalizer under the control of the controller 17. Furthermore, Dolby noise reduction, switching of frequency adjustments depending upon normal running speed/doubled speed, and adjustments of frequency characteristics depending upon normal tape/chrome tape/metal tape are performed.

Next, the operation of the signal processing apparatus of the tape player constructed as described above will be explained.

Analog Reproducing Operation

When magnetic tape on which analog signals, such as audio signals, are recorded is loaded and analog signals are reproduced by the analog reproducing magnetic head 27, these analog signals are input to the analog to digital converter 11 through the analog reproducing amplifier 29. The analog reproduced signals are converted into digital signals by the analog to digital converter 11 and input to the sub-band filters 14 and 15.

The sub-band filters 14 and 15 divide the input digital signals into signals corresponding to each band of the analog frequency. For example, the signals are divided into 32 signals corresponding to bands at 150 kHz intervals of analog frequency.

The DSP section 16 switches frequency characteristics of digital signals corresponding to respective frequency bands divided into, for example, 32 portions in accordance with a control signal from the controller 17. In this operation, the DSP section 16 functions as a reproducing equalizer by switching under the control of the controller 17. Furthermore, Dolby noise reduction, adjustments of frequency characteristics in accordance with the tape running speed or the like are performed.

The signals processed by the DSP section 16 are sent to the digital to analog converter 13 where the signals are output as analog reproduced signals. Or, the signals are directly output as digital signals without conversion by the digital signal input and output unit 12.

In addition, since the ECC section 20 has a data interpolation function in the embodiment shown in FIG. 1, it is possible to interpolate reproduced signals by using that function. In this case, the analog reproduced signals may be converted into digital signals and sent to the ECC section as indicated by the alternately long and short dashed line "a" after the signals are passed through the sub-band filters 14 and 15. After data interpolation is performed thereon, the signals may be input to the DSP section 16. Interpolation of analog reproduced signals is made possible by using the interpolation function of the ECC section 20. Thus, noise caused by tape damages or the like can be removed.

Digital Recording Operation

Acoustic analog signals are input to the analog to digital converter 11 where the signals are converted into digital signals. When input signals are sent from a CD player or the like as digital signals, the signals are input to the digital signal input and output unit 12. These input digital signals are divided into 32 signals, for example, at 150 kHz intervals of the analog frequency by the sub-band filters 14 and 15.

These signals corresponding to respective 32-divided bands are compressed into signals with audible bands as main bands and encoded by the operational section 18. The signals are formatted by the SBC section 19, and an error correction code is added thereto by the ECC section 20. The signals are recorded on the magnetic tape T by the magnetic head 25 after passing through the recording digital amplifier 24 from the DSP section 21.

Digital Reproduction

When digital signals are reproduced from the magnetic tape T by the reproducing magnetic head 26, the digital signals are amplified by the reproducing digital amplifier 23. After passing through the digital equalizer 22 and the DSP section 21, the signals are subjected to and error correction and interpolation performed by the ECC section 20. Furthermore, the signals are deformatted by the SBC section 19 and made into compound signals by the operational section 18. Then, the signals are reconstructed by the sub-band filters 14 and 15 and output from the digital signal input and output unit 12 or the digital to analog converter 13.

Even though an analog reproduction operation only has been explained in the above-described embodiment, the circuit of the digital recording and reproducing system A may be used also in the recording of analog signals. For example, analog signals may be recorded as follows: these signals are converted into digital signals by the analog to digital converter 11 and divided into signals corresponding to each frequency band by the sub-band filters 14 and 15. Then, a frequency adjustment operation, such as Dolby noise reduction, is performed by the DSP section 16. Thereafter, the signals are decoded into analog signals by the digital to analog converter 13 so that analog recording is performed on magnetic tape by an amplifier and a magnetic head. Recording media are not limited to magnetic tape; recording and reproducing disk units may also be used.

According to the present invention, as described above in detail, since analog processing is performed by a digital processing section, parts for analog processing need not to be used, decreasing the number of components of the circuit. In addition, since all signal processing circuits can be formed as digital circuits, circuit design, circuit control and adjustment operations are made easier.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included with the spirit and scope of the claims. The following claims are to be accorded the broadest interpretation, so as to encompass all such modifications and equivalent structures and functions.

What is claimed is:

1. A data processing apparatus comprising:
    an analog reproducing system for reading analog information from an analog information recording medium and for generating a first analog signal in response to the analog information;
    a digital recording and reproducing system including:
        means for reading digital information from a digital information recording medium and for generating a reproduced digital signal;
        an analog-to-digital converting section connected to the analog reproducing system for receiving the first analog signal and for converting the reproduced analog signal into a converted digital signal;
        a first digital signal processing section connected to the means for reading digital information for receiving the reproduced digital signal, and for generating a first processed digital signal in response to the reproduced digital signal;
        a second digital signal processing section connected to the analog-to-digital converting section for receiving the converted digital signal, and for generating a second processed digital signal in response to the converted digital signal;
        a digital-to-analog converting section for converting either of the first processed digital signal and the second processed digital signal into a processed analog signal;
        a band-pass filter section connected between the analog-to-digital converting section and the second digital signal processing section for dividing the converted digital signal into a plurality of frequency band signals, each frequency band signal corresponding to one of a plurality of predetermined frequency bands;
        means for writing digital information onto a digital information recording medium;
        an error correction code section, connected to the means for reading digital information and the means for writing digital information, for interpolating the reproduced digital signal, and for transmitting the interpolated reproduced digital signal to the second digital signal processing section;
        an operational section connected to the band-pass filter section for compressing and encoding the plurality of frequency band signals; and
        a sub-band coding section connected to the operational section for formatting the compressed and encoded frequency band signals and for transmitting the formatted, compressed and encoded frequency band signals to the error correction code section for transmission to the means for writing digital information.

2. A data processing apparatus according to claim 1 further comprising a controller connected to the second digital signal processing section for controlling a processing mode of the second digital signal processing section.

3. A data processing apparatus according to claim 1 wherein the second digital signal processing section includes means for setting frequency characteristics for the plurality of frequency band signals.

* * * * *